US010841507B2

(12) United States Patent
Schürf et al.

(10) Patent No.: US 10,841,507 B2
(45) Date of Patent: Nov. 17, 2020

(54) IMAGING A WELL OF A MICROPLATE

(71) Applicant: TECAN TRADING AG, Männedorf (CH)

(72) Inventors: Markus Schürf, Bergen (DE); Frank Münchow, Munich (DE); Christian Oberdanner, Lamprechtshausen (AT); Alexander Kaser, Puch bei Hallein (AT)

(73) Assignee: TECAN TRADING AG, Männedorf (CH)

( * ) Notice: Subject to any disclaimer, the term of this patent is extended or adjusted under 35 U.S.C. 154(b) by 244 days.

(21) Appl. No.: 16/015,363

(22) Filed: Jun. 22, 2018

(65) Prior Publication Data
US 2018/0376048 A1  Dec. 27, 2018

(30) Foreign Application Priority Data

Jun. 26, 2017  (EP) .................................... 17177843

(51) Int. Cl.
*G06T 5/00* (2006.01)
*G06T 5/50* (2006.01)
(Continued)

(52) U.S. Cl.
CPC ........... *H04N 5/2356* (2013.01); *G06T 5/009* (2013.01); *G06T 5/50* (2013.01); *H04N 5/2353* (2013.01);
(Continued)

(58) Field of Classification Search
None
See application file for complete search history.

(56) References Cited

U.S. PATENT DOCUMENTS 7,732,743 B1 *  6/2010  Buchin ..................... G06T 5/50
250/208.1
8,744,164 B2  6/2014  Ozinsky et al.
(Continued)

FOREIGN PATENT DOCUMENTS

CN  1717579 A   1/2006
CN  101424856 A   5/2009
(Continued)

OTHER PUBLICATIONS

Xiong et al., "Detection of Unstained Living Neurospheres from Phase Contrast Images with Very Large Illumination Variations", 33$^{rd}$ Annual International Conference of the IEEE EMBS, Sep. 3, 2011, 4 pages.
(Continued)

*Primary Examiner* — Neil N Turk
(74) *Attorney, Agent, or Firm* — Nixon & Vanderhye, P.C.

(57) ABSTRACT

An imaging system and method are provided in which a well of a microplate 050 is imaged by a camera 110 comprising magnification optics 112. The camera is controlled to acquire a series of images of the well with different exposures. The series of images comprise a base image with a base exposure and at least one further image with a larger exposure than the base exposure. The series of images are then merged into an output image which comprises in a center region of the well image content from the base image and at a peripheral region of the well image content from the at least one further image. Advantageously, the output image may allow for better assaying or analysis of the samples in the well than any of the individual images.

18 Claims, 6 Drawing Sheets

(51) Int. Cl.
*G06T 7/00* (2017.01)
*G06T 7/10* (2017.01)
*G06T 7/174* (2017.01)
*G06T 7/60* (2017.01)
*H04N 5/235* (2006.01)
*H04N 5/232* (2006.01)
*H04N 5/265* (2006.01)
*G06K 9/00* (2006.01)

(52) U.S. Cl.
CPC ....... *H04N 5/2354* (2013.01); *H04N 5/23212* (2013.01); *H04N 5/23296* (2013.01); *H04N 5/265* (2013.01); *G06T 2207/10056* (2013.01); *G06T 2207/20016* (2013.01); *G06T 2207/20208* (2013.01); *G06T 2207/20221* (2013.01); *G06T 2207/30072* (2013.01)

(56) References Cited

U.S. PATENT DOCUMENTS

| | | |
|---|---|---|
| 8,760,506 B2 | 6/2014 | Alexandrov |
| 2003/0096302 A1* | 5/2003 | Yguerabide ....... G01N 15/1468 435/7.1 |
| 2004/0218804 A1 | 11/2004 | Affleck et al. |
| 2005/0117144 A1 | 6/2005 | Greenway et al. |
| 2014/0247974 A1 | 9/2014 | Figg et al. |

FOREIGN PATENT DOCUMENTS

| | | |
|---|---|---|
| CN | 104835130 A | 8/2015 |
| EP | 2 403 234 | 1/2012 |
| JP | 2016/071117 | 5/2016 |
| WO | 2012/138775 | 10/2012 |
| WO | 2015/156378 | 10/2015 |

OTHER PUBLICATIONS

Rubinstein, Fusion of Differently Exposed Images, Technion, Israel Institute of Technology, Oct. 2004, 14 pages.

* cited by examiner

400

410

IMAGING A WELL OF A MICROPLATE

This application claims priority to EP Patent Application No. 17177843.4 filed 26 Jun. 2017, the entire contents of which are hereby incorporated by reference.

FIELD OF THE INVENTION

The invention relates to a method and imaging system for imaging individual wells of a microplate. The invention further relates to a computer program comprising instructions for causing a processor system to perform the method.

BACKGROUND ART

Devices and apparatuses with which the contents of one or more wells of a microplate can be assayed or analyzed in an optical manner have been known for some time and are also commonly referred to as 'microplate readers'.

The microplates which are assayed or analyzed are typically multi-well plates which have a plurality of wells or containers arranged in an array. Such microplates may be standardized, e.g., in terms of their footprint dimensions. An example of such a standard is the ANSI/SLAS standard, e.g., with ANSI SLAS 1-2004 (R2012) defining footprint dimensions, ANSI SLAS 2-2004 (R2012) defining height dimensions, ANSI SLAS 3-2004 (R2012) defining bottom outside flange dimensions, ANSI SLAS 4-2004 (R2012) defining well positions and ANSI SLAS 6-2012 defining well bottom elevation. Various standard microplates are known, for example having wells that are equipped with a round, flat or V-shaped bottom.

Known microplate readers may be equipped with one or more light sources and/or detectors to assay or analyze samples in the wells of microplates on the basis of their absorption, and/or fluorescence and/or luminescence. For example, as detector, a camera may be used to acquire one or more images of the samples in the well.

JP2016071117 A2 describes an imaging apparatus and an imaging method for imaging a sample formed by injecting a liquid into a sample container. It is said that in such an imaging apparatus, when illumination light is made incident from above the sample and imaging is performed by receiving light transmitted from the bottom surface of the container, refraction of the illumination light occurs by the meniscus of the injected liquid surface. Accordingly, the image is said to become dark at the peripheral portion of the sample close to the sample container wall surface.

To address this problem, JP2016071117 A2 disposes an aperture stop on the side of the image pickup means with respect to the focal position of the objective lens to converge the light whose path is bent due to the meniscus effect of the liquid surface. It is said that by moving the aperture stop away from the objective lens, it is possible to take in light from a direction having a large inclination with respect to the optical axis, and to increase the amount of light received by the imaging means. By utilizing this fact, it is possible to compensate for the decrease in light quantity due to the influence of the meniscus at the peripheral portion of the sample.

JP2016071117 A2 thus provides a mechanical movable aperture stop to compensate for the light reduction in the acquired images due to the meniscus.

SUMMARY OF THE INVENTION

It would be advantageous to obtain a mechanically less complex solution for acquiring an image of a well in which the influence of the meniscus is reduced.

In accordance with a first aspect of the invention, an imaging system is provided for imaging individual wells of a microplate.

The imaging system comprises:
a camera comprising magnification optics to establish a field of view encompassing a well when the well is positioned within the field of view of the camera;
a camera interface configured to provide control data to the camera to control the imaging by the camera, and to receive image data acquired by the camera;
a light source for illuminating the well;
a memory comprising instruction data representing a set of instructions; and
a processor configured to communicate with the camera interface and the memory and to execute the set of instructions, wherein the set of instructions, when executed by the processor, cause the processor to:
control the camera to acquire a series of images of the well with different exposures, the series of images comprising a base image with a base exposure and at least one further image with a larger exposure than the base exposure, and
merge the series of images into an output image which comprises in a center region of the well image content from the base image and at a peripheral region of the well image content from the at least one further image.

In accordance with another aspect of the invention, a method is provided of imaging individual wells of a microplate with an imaging system.

In this method, the imaging system comprises:
a camera comprising magnification optics to establish a field of view encompassing a well when the well is positioned within the field of view of the camera;
a camera interface configured to provide control data to the camera to control the imaging by the camera, and to receive image data acquired by the camera;
a light source for illuminating the well;
The method comprises:
controlling the camera to acquire a series of images of the well with different exposures, the series of images comprising a base image with a base exposure and at least one further image with a larger exposure than the base exposure; and
merging the series of images into an output image which comprises in a center region of the well image content from the base image and at a peripheral region of the well image content from the at least one further image.

In accordance with another aspect of the invention, a transitory or non-transitory computer-readable medium is provided comprising a computer program which comprises instructions for causing a processor system to perform the method.

The above aspects of the invention involve imaging a well of a microplate. For that purpose, a camera is provided, which may comprise an image sensor and optics such as one or more lenses. In particular, the camera comprises magnification optics which establish a field of view that can encompass an entire well when the well is suitably positioned within the field of view of the camera. Such positioning may be manual but may also be automatic. An example of the latter may be positioning by the microplate transport mechanism of a microplate reader. For example, the magnification optics may be selected to fit the well of a standard microplate, such as but not limited to a 96-well microplate according to the ANSI/SLAS standard. As such, the camera may capture a well of a 96-well microplate in a single image, without needing to, e.g., acquire multiple images covering different parts of the well and stitching them together. Furthermore, a camera interface is provided which allows the camera to be controlled by a processor, and the acquired image data to be transmitted to the processor.

The processor is configured by software to control the camera to acquire a series of images of the well with different exposures. For example, the camera may use different apertures, shutter speeds and/or sensitivity settings (e.g., ISO setting). Additionally or alternatively, if the light source is controllable by the processor, e.g., via an optional light source control interface, different light intensities may be used to differently illuminate the well. Accordingly, a series of images may be acquired providing a series of different exposures with respect to the sample in the well. For example, the exposure may be incrementally enlarged with respect to a base exposure setting. Here, the terms 'enlarged' and 'larger' refer to a larger amount of light being captured, e.g., by using a larger aperture, a slower shutter speed, a higher sensitivity setting of the camera and/or a higher illumination intensity of the light source. Each of the series of mages thus provides a differently exposed view of the same well.

The inventors have recognized that when the image is exposed to optimally capture a center region of the well, e.g., by minimizing the amount of clipping of image contents in the center region, parts of the periphery of the well are under-exposed due to the meniscus formed by the liquid within the well directing the transmitted or reflected light away from the camera. This reduces the visibility of image detail in the peripheral region, thereby reducing the visibility of objects in the sample, such as individual cells, bacteria, spores, etc. It has been found that when a larger exposure setting is used, a better visibility of the periphery of the well may be obtained, but at the expense of over-exposing the central region. To address this problem, the above measures acquire the aforementioned series of images at different exposures, and combine them by merging them into an output image. In particular, the output image is generated such that the peripheral region of the well comprises image content from one or more images with a larger exposure, whereas the center region of the well comprises image content from one or more images with a smaller exposure. Here, 'image content from an image' is to be understood as including a selection of pixels from the image, but also include the selection of particular frequency components or bands. Effectively, differently exposed images, which each may comprise a different well-exposed region, are merged together to obtain an output image. Thereby, the effect of the meniscus is reduced.

Advantageously, the output image as generated by the imaging system may allow for better assaying or analysis of the samples in the well than any of the individual images. By acquiring images at different exposures and using image processing to combine the acquired images, no mechanically complex solution is needed to reduce the effect of the meniscus in the output image.

Optionally, the set of instructions, when executed by the processor, cause the processor to select the base exposure to minimize clipping in the center region of the well in the base image. The base exposure setting may be selected to optimally expose the center region of the well, with one or more larger-exposure images being additionally acquired to optimally expose a peripheral region of the well. Such a base exposure setting may be predefined or automatically selected using any known techniques for selecting an optimal exposure setting for a particular image region, as known from, e.g., the technical field of photography and related technical fields.

Optionally, the set of instructions, when executed by the processor, cause the processor to merge the series of images into the output image by selecting a different set of frequency components from each of the series of images for inclusion in the output image. For example, lower frequency components may be selected from the base image, and higher frequency components may be selected from the further image, while omitting selecting the lower frequency components from the further image. The inventors have considered that the peripheral region, even if optimally exposed to minimize clipping, may still distort lower spatial frequencies, and that image quality may be improved by only selecting higher spatial frequencies from said region. Such higher spatial frequencies may still show objects such as cells. Accordingly, the lower spatial frequencies, which may be selected from the base image for inclusion in the output image, may not be selected from the further image(s). Here, the terms 'higher' and 'lower' are defined relative to each other rather than in absolute terms, and do not denote a particular frequency band but rather their relative frequency content.

Optionally, the set of instructions, when executed by the processor, cause the processor to select the different set of frequency components from each of the series of images by:
  generating a Laplacian of Gaussian pyramid representation of the base image; and
  generating a Laplacian of Gaussian pyramid representation of the further image which comprises fewer levels than the Laplacian of Gaussian pyramid representation of the base image and thereby omits the lower frequency components.

Laplacian of Gaussian (LoG) pyramid representations of images are known per se, with a Laplacian of Gaussian filter also being referred to as a 'Mexican hat' filter. Conventionally, the lowest level of such a pyramid represents the highest spatial detail, e.g., having the same resolution as the input image, with each addition level adding increasingly lower-frequent spatial detail. By generating the Laplacian of Gaussian pyramid representation to have fewer levels for the further image than for the base image, said representation extends less towards the lower frequencies than the representation of the base image. This provides an efficient way of including higher spatial frequencies of the further image in the output image but not lower spatial frequencies. It is noted that alternatively any other suitable linear transform may be used which decomposes an image into various components, e.g., by multiplication with a set of transform functions. For example, a Difference of Gaussian pyramid representation may be used or Singular Value Decompositions. Alternatively to a multiscale or pyramidal representation, a different set of frequency components may also be selected from each of the series of images for inclusion in the output image based on Discrete Fourier, Discrete Cosine and/or Wavelet Transforms.

Optionally, the set of instructions, when executed by the processor, cause the processor to generate the output image by:
  calculating an intermediate base output image from the Laplacian of Gaussian pyramid representation of the base image;
  calculating an intermediate further output image from the Laplacian of Gaussian pyramid representation of the further image; and merging the intermediate base output image and the intermediate further output image.

For example, the merging of the intermediate base output image and the intermediate further output image may comprise summing or averaging the intermediate base output image and the intermediate further output image.

Optionally, the set of instructions, when executed by the processor, cause the processor to generate the output image by:

combining the Laplacian of Gaussian pyramid representation of the base image and the Laplacian of Gaussian pyramid representation of the further image to obtain a combined Laplacian of Gaussian pyramid representation; and deriving the output image from the combined Laplacian of Gaussian pyramid representation.

Here, the 'deriving' is also referred to as 'reconstructing', referring to the inverse step of the decomposition of the image, e.g., the 're-composition'.

Optionally, the set of instructions, when executed by the processor, cause the processor to:

control the camera to acquire a first series of images of the well having a first focus position with respect to the well;

control the camera to acquire a second series of images of the well having a second focus position with respect to the well;

merge the first series of images into a first output image;

merge the second series of images into a second output image;

generate a bright field output image as a sum or average of the first output image and the second output image.

A separate output image is thus generated in the previously described manner(s) for two different focus positions. For example, both focus positions may be located at a predefined distance from an initial focus position. The initial focus position may be pre-determined, but may also be determined during operation of the imaging system, e.g., using autofocus. For example, autofocus may determine as initial focus position a position located at or near the bottom of the well. Accordingly, one focus position, which may be termed 'Z-plus', may be above the bottom of the well, e.g., within the sample, whereas the other focus position, which may be termed 'Z-minus', may be below the bottom of the well. Both focus positions may cause the images to be slightly out of focus. It has been found that by summing or averaging the output images, a better visibility of objects in the samples may be obtained than by focusing solely on the center of the sample in the well. Here, the term 'average' includes a weighted average. It is noted that the resulting output image is termed 'bright field' output image to distinguish this output image from the later-described 'phase contrast' output image. Alternatively, only one of the output images may be used, e.g., the output image generated using the 'Z-plus' focus position.

Optionally, the set of instructions, when executed by the processor, cause the processor to generate a phase difference output image as a difference of the first output image and the second output image. The difference between the output images generated for the two different focus positions may also be useful for assaying or analysing the sample. This type of output image may show objects such as cells in a roughly similar manner as an image acquired by phase contrast imaging, and is thus referred to as a 'phase contrast' output image without actually being acquired by phase contrast imaging. The phase contrast output image may be generated by the imaging system additionally or alternatively to the bright field output image.

Optionally, the imaging system may comprise a light source control interface for controlling the light source. Accordingly, the processor may control the light source, e.g., its illumination intensity, and thereby affect or determine the different exposure of the well in the series of acquired images.

It will be appreciated by those skilled in the art that two or more of the above-mentioned embodiments, implementations, and/or aspects of the invention may be combined in any way deemed useful.

Modifications and variations of the method and/or the computer program, which correspond to the described modifications and variations of the imaging system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
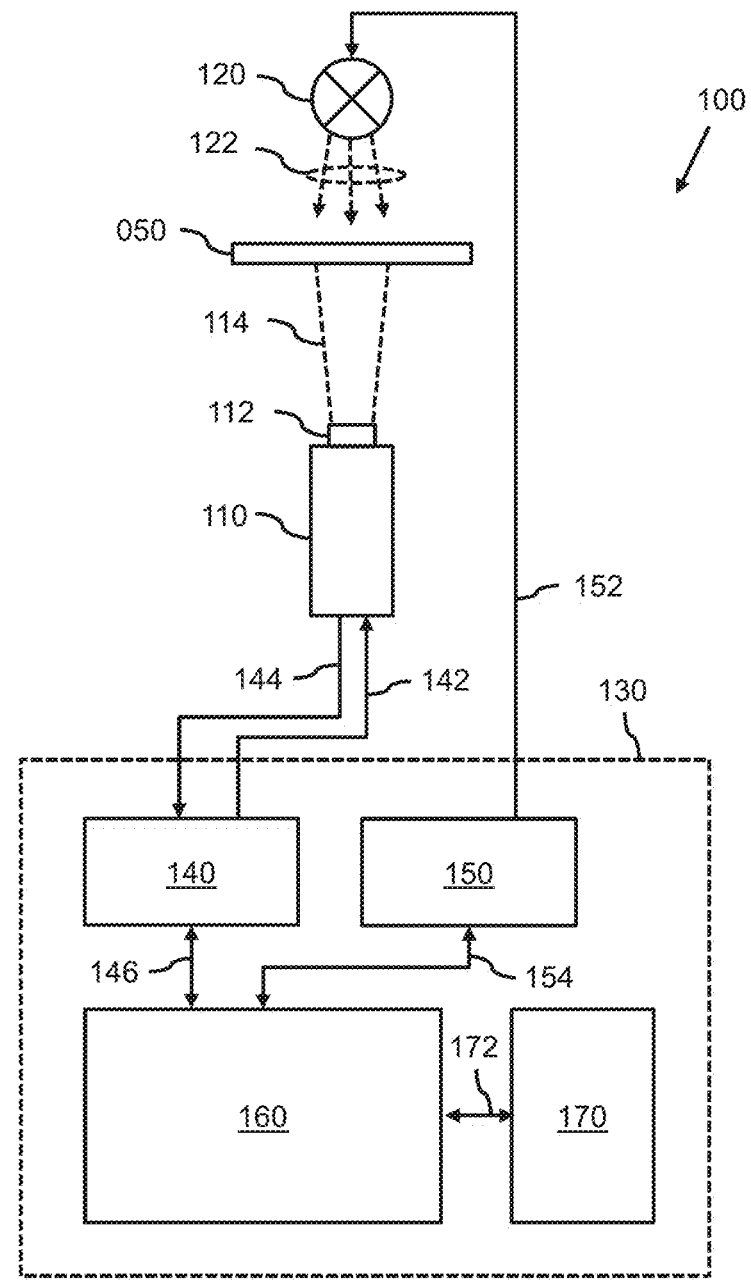
FIG. 1 shows an imaging system for imaging individual wells of a microplate, which is shown to comprise a camera and a processor subsystem.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

050 microplate
060 well
100 imaging system
110 camera
112 magnification optics
114 field of view 120 light source
122 emitted light
130 processor subsystem
140 camera interface
142 camera control data
144 image data
146 internal data communication
150 light source control interface
152 light source control data
154 internal data communication
160 processor
170 memory
172 memory data communication
200 base image
202 central portion
210 further image
212 peripheral portion
300 intermediate base output image
310 intermediate further output image
400 bright field output image
410 phase contrast output image
500 method for imaging wells with imaging system
510 controlling camera to acquire image series
520 merging image series into output image
600 computer readable medium
610 non-transitory data

DETAILED DESCRIPTION OF EMBODIMENTS

FIG. 1 shows an example of an imaging system 100 for imaging individual wells of a microplate 050. The imaging system 100 is shown to comprise a camera 110, which may be of any suitable type for imaging samples in a microplate. For example, the camera may be a still image or video camera equipped with a CMOS or CCD-type sensor. The camera is shown to comprise magnification optics 112, thereby establishing a certain field of view 114. The field of view 114 is chosen such that when a microplate 050 is brought into an imaging position, the imaging system can acquire an image of substantially an entire well of the microplate 050. For that purpose, the type of magnification optics, the distance of the microplate 050 to the camera and optical parameters may be chosen such that the well fits within the field of view of the camera. For example, the imaging system 100 may comprise a microplate holder which puts the microplate 050 at a predetermined or determinable distance from the camera 110. The selection of such design parameters is within reach of the skilled person. In a specific example, the camera may be a CMOS camera having a 5 Megapixel resolution and ⅔" sensor size, the optics may comprise a tubus 0.5× lens and a 2× magnification objective, e.g., with an numerical aperture (NA) of 0.08, a working distance of 6.20 mm, a Field of View of 13.25 mm and an XY resolution of 4.19 μm. Moreover, the microplate 050 may be an ANSI-size 96-well microplate.

The imaging system 100 is further shown to comprise a light source 120 for illuminating the well. For example, the light source 120 may be a light emitting diode (LED) or an arrangement of LEDs, or in general may be embodied by any another suitable type of light source. In the example of FIG. 1, the light source 120 is shown to illuminate the well from above, whereas the camera 110 is arranged below the well. Alternatively, the placement of camera 110 and light source 120 may be reversed, in that the light source 120 may illuminate the well from below, and the camera 110 may be arranged above the well. It is noted that, in general, the light 122 captured by the camera may be light 122 which is transmitted through the sample in the well due to the camera 110 and the light source 120 being positioned at opposite sides of the microplate. To enable such transmission of light 122 through the sample, the well may have a transparent bottom portion, and/or the entire microplate 050 may be transparent. Alternatively, the camera 110 and the light source 120 may be positioned at a same side of the microplate, in which case the light 122 may be reflected light. Although not shown in FIG. 1, one or more lenses may be used to image the light source 120 at infinity. As a result, the light emitted by the light source 120 and incident on the microplate 050 may form parallel rays of light, e.g., a parallel illumination beam.

The imaging system 100 is further shown to comprise a processor subsystem 130, which may comprise a camera interface 140, a memory 170 and a processor 160, with the processor 160 communicating with the camera interface 140 via data communication 146 and with the memory 170 via data communication 172.

The camera interface may be configured to provide control data 142 to the camera 110 to enable the processor 160 to control the imaging by the camera 110, and to enable the processor 160 to receive image data 144 acquired by the camera 110.

The memory 170 may comprise instruction data representing a set of instructions, which when executed by the processor 160 during operation of the imaging system 100, cause the processor 160 to control the camera 110 to acquire a series of images of the well with different exposures. The series of images may comprise a base image with a base exposure and at least one further image with a larger exposure than the base exposure. The processor 160 may be further configured by the instruction data to merge the series of images into an output image which comprises in a center region of the well image content from the base image and at a peripheral region of the well image content from the at least one further image.

Optionally, the processor subsystem 130 may comprise a light source control interface 150 for controlling the light source 120. The processor 160 may communicate with the light source control interface 150 via data communication 154.

Various examples of the operation of the imaging system 100, including optional aspects thereof, will be further explained with reference to FIGS. 2A-4B.

In general, the camera interface 140 may take any suitable form, including but not limited to USB, FireWire, Wi-Fi, and similar types of wired and wireless data communication interfaces. It is noted that the camera interface may comprise or consist of multiple interfaces, e.g., arranged in parallel and/or series. For example, the camera interface 140 may comprise a HDMI interface for receiving the image data from the camera, and an 12C interface for controlling the camera. Although not shown explicitly in FIG. 1, the camera 110 may comprise a corresponding camera interface.

In some embodiments, the processor subsystem 130 may be implemented as a device, apparatus or system separate from the camera 110. For example, the processor subsystem 130 may be embodied by a workstation, a server, a personal computer, etc., which may be connected to the camera 110 via the camera interface 140. In a specific embodiment, the camera 110 may be part of a microplate reader, which may further include the light source 120 and a microplate transport (not shown in FIG. 1) and which may be connected to the device, apparatus or system embodying the processor subsystem 130 via one or more data communication interfaces, including but not limited to the camera interface 140.

Alternatively, the camera 110 and the processor subsystem 130 may be part of a same device, apparatus or system, e.g., a microplate reader having one or more embedded processors capable of and configured for performing the operations described with reference to the processor 160.

In general, the processor subsystem 130 may be embodied as—or in—a device, apparatus or system. The device, apparatus system may comprise one or more processors, such as microprocessors, which execute appropriate software. Software implementing the described operations of processor 160 may have been downloaded and/or stored in a corresponding memory 170 or memories, e.g., in volatile memory such as RAM or in non-volatile memory such as Flash. Alternatively, the processor 160 may be implemented in the device, apparatus or system in the form of programmable logic, e.g., as a Field-Programmable Gate Array (FPGA). The camera interface and the optional light source control interface may each be implemented by respective interfaces of the device, apparatus or system. In general, each unit of the processor subsystem may be implemented in the form of a circuit and/or in a distributed manner, e.g., involving different devices or apparatuses. For example, the distribution may be in accordance with a client-server model, e.g., using a server and a client workstation.

Figure 2A:
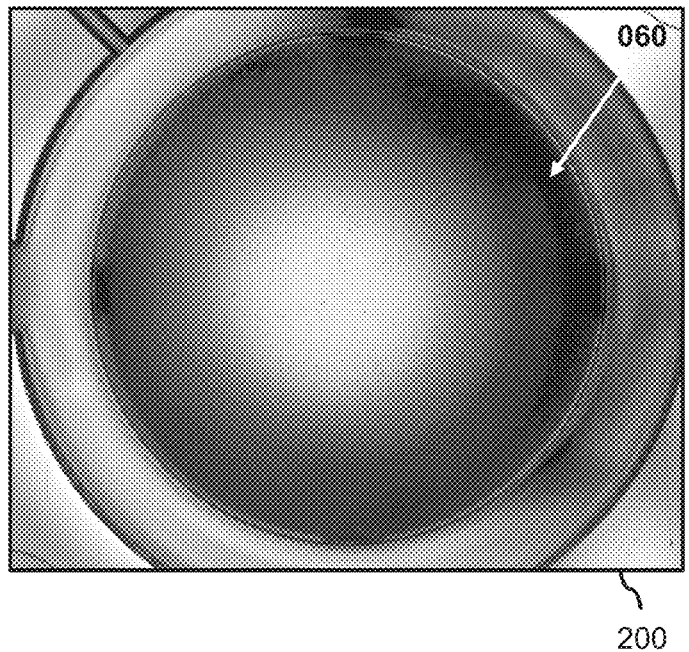
FIG. 2A shows an image of a well acquired with a base exposure setting.
Figure 2B:
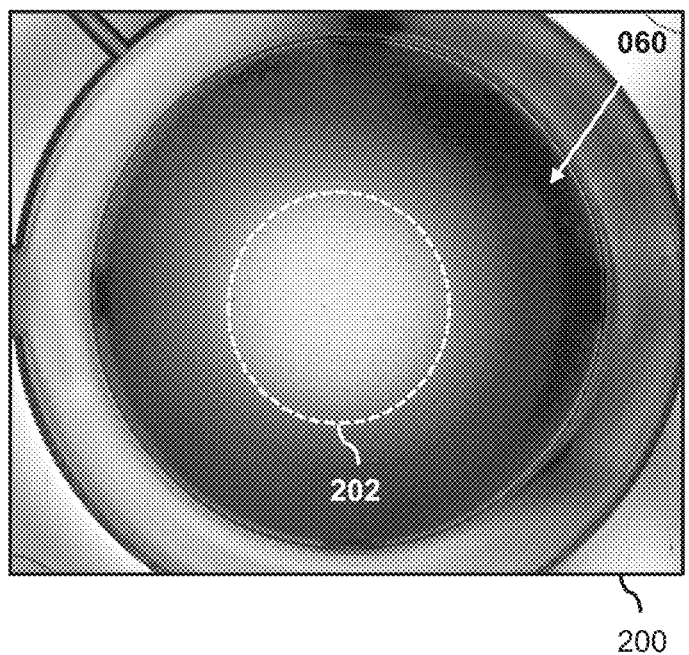
FIG. 2B indicates a well-exposed central region in the image of FIG. 2A.

FIG. 2A shows an image 200 of a well of a microplate which may be acquired with an imaging system as described in this specification. For example, the image 200 may be acquired of a single well of a 96-plate microplate with 2× magnification optics. The image 200 is acquired with a base exposure setting. Accordingly, the image 200 may be referred to as a base image 200. The base exposure setting may be a setting which avoids over-exposure. In a specific example, and as illustrated in FIG. 2B, the base exposure setting may be selected to well-expose a central region 202 of the well 060. Such exposure setting may be pre-determined, or dynamically determined using any known technique for selecting an exposure setting, e.g., as known per se in the technical field of photography and related technical fields. It can be seen in FIGS. 2A and 2B that the base image 200 shows image details such as cells in the central region 202, but is underexposed in the periphery of the well, causing image details to be poorly visible or not visible at all. Such underexposure may at least in part be caused by a meniscus formed by liquid in the well 060.

The base image 200 may be part of a series of images which may be acquired by the imaging system with increasingly larger exposure settings. For example, the exposure may be incrementally increased, or each time increased by a same factor, e.g., a factor of two or four. Accordingly, the series of images comprises at least two images, e.g., the base image and a further image, but possibly more images.

It is noted that the series of images may also be acquired while incrementally decreasing the exposure setting, in which case the base image may be the last image to be acquired, or in any other suitable acquisition order.

Figure 2C:
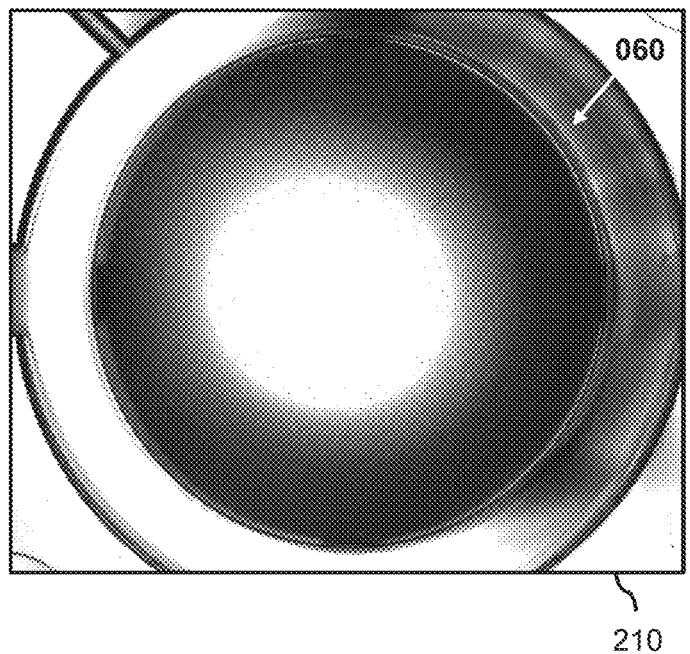
FIG. 2C shows an image of the well acquired with a larger exposure setting.
Figure 2D:
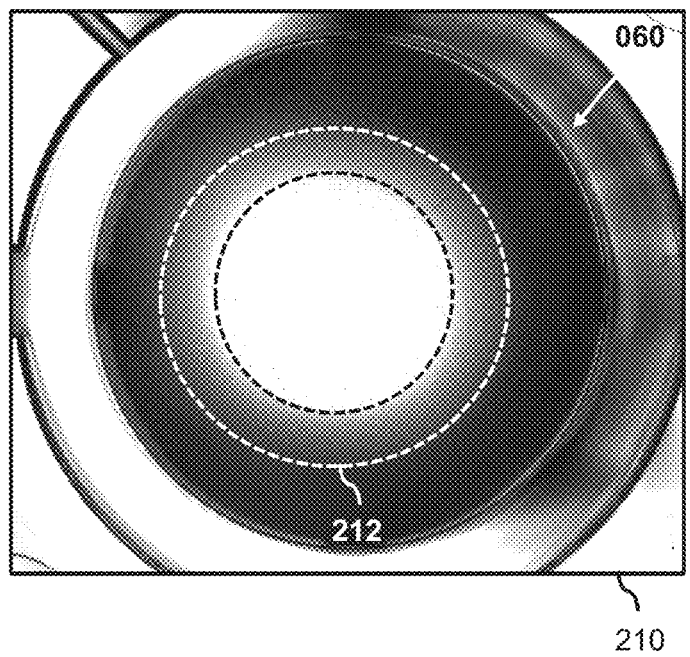
FIG. 2D indicates a well-exposed peripheral region in the image of FIG. 2C.

FIGS. 2C and 2D show such a further image acquired with larger exposure setting. To emphasize the difference with respect to the base image of FIGS. 2A and 2B, the further image 210 of FIGS. 2C and 2D has been acquired with a 4× as large exposure setting, e.g., a 4× as slow shutter speed. It can be seen that the larger exposure setting causes over-exposure in the central region of the well 060, thereby causing image details to clip and thereby to be poorly visible or not visible at all. However, as also shown in FIG. 2D, a peripheral region 212 (denoted by a white dashed outer line and a black dashed inner line, thus being ring-shaped) which was underexposed in the base image is better exposed in the further image 210, thereby increasing the visibility of image detail such as cells in the peripheral region 212.

Having acquired the base image and the further image, or in general a series of images with different exposure settings, the images may be merged into an output image which comprises in a center region of the well image content from the base image and at a peripheral region of the well image content from the further image(s). For that purpose, various techniques may be used. Generally speaking, the output image may be generated by, for a given region in the output image, selecting the image content of image(s) which provide a well-exposed imaging of the region. It will be appreciated that whether a particular region is well-exposed or not may be determined dynamically, e.g., using known techniques including exposure detection techniques or clipping detection techniques, or may be predetermined. In a specific example, clipped pixels may be detected in each of the images, and the output image may be generated as an average, median or other statistical function of the non-clipped pixels across the different images. Another example is that a fixed central region of the output image may be selected for inclusion from the base image, whereas surrounding ring-shaped region(s) may be selected for inclusion from the further image(s).

In an embodiment, the series of images may be merged into an output image by selecting a different set of frequency components from each of the series of images for inclusion in the output image. For example, a Laplacian of Gaussian pyramid representation of the base image may be generated, as well as a Laplacian of Gaussian pyramid representation for each of the further images. Such a Laplacian of Gaussian pyramid representation may henceforth also be simply referred to as a 'LoG pyramid'. The LoG pyramid of the further image(s) may comprise fewer levels than the LoG pyramid of the base image, thereby omitting lower frequency components from the representation. In case of more than one further image, each representation may progressively comprise fewer levels, thereby obtaining representations which progressively contain fewer low-frequency components. In a specific example, if the LoG pyramid of the base image is generated having N levels, the LoG pyramid of the further image may be generated having N−1 levels and the LoG pyramid of yet a further image may be generated having N−2 levels. Thereby, increasingly more low-frequencies may be omitted from the representations of the respective images.

Figure 3A:
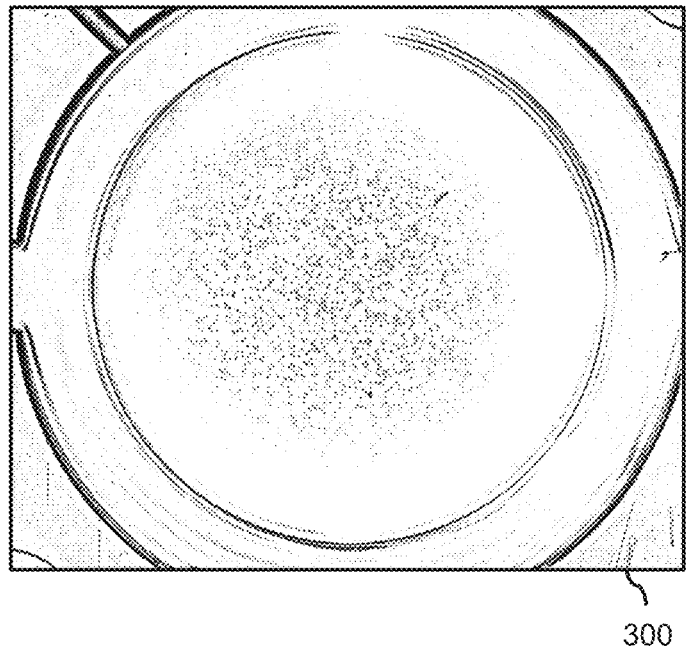
FIG. 3A shows an intermediate base output image which may be obtained by generating a Laplacian of Gaussian pyramid representation of the base image and converting the representation into an output image.
Figure 3B:
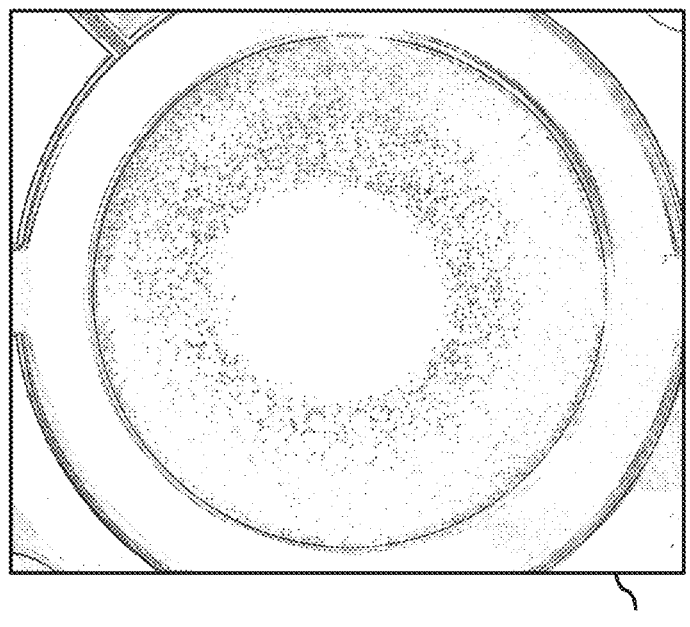
FIG. 3B shows an intermediate further output image which may be obtained by generating a Laplacian of Gaussian pyramid representation of the further image and converting the representation into an output image.

The LoG pyramids may then be combined to obtain an output image. This may be done in several ways. For example, said representations may be first combined, e.g., by averaging, summing or in any other way combining LoG pyramids per level, thereby obtaining a combined LoG pyramid which may be converted into an output image by known means, e.g., by summing across all levels and adding an offset. For example, the offset may be 0.5 in case the resulting image should have normalized intensity values between 0 and 1. Another example is that each pyramid may be individually converted into an intermediate output image, with the intermediate output images then being merged into a single output image, e.g., by averaging, summing or in any other way. The latter example is illustrated in FIGS. 3A and 3B: FIG. 3A shows the intermediate output image as generated from the LoG pyramid of the base image of FIGS. 2A and B2B and FIG. 3B shows the intermediate output image as generated from the LoG pyramid of the further image of FIGS. 2C and 2D. Both images may then be combined, e.g., by averaging or summing, which may yield in the case of averaging an output image similar to that shown in FIG. 4A.

Instead of a Laplacian of Gaussian pyramid representation, also a Difference of Gaussian pyramid representation may be used, or any other suitable pyramidal representation which represents a frequency decomposition of an image.

Figure 4A:
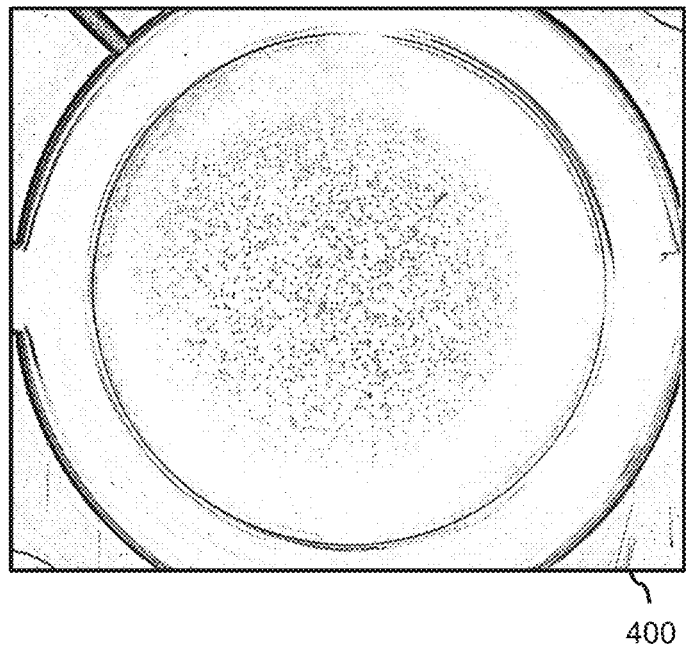
FIG. 4A shows a bright field output image.

However, FIG. 4A shows a slight variation of such an output image, in that the output image 400 of FIG. 4A is obtained by the processor controlling the camera to acquire a first series of images of the well having a focus position above the bottom of the well ("Z-plus"), controlling the camera to acquire a second series of images of the well having a focus position below the bottom of the well ("Z-minus"), merging the first series of images into a first output image, merging the second series of images into a second output image, and generating a bright field output image 400 as a sum or (weighted) average of the first output image and the second output image. Effectively, output images obtained from image series acquired at different focal distances may be combined by summing or averaging, resulting in an output image 400 which is termed 'bright field' output image. It is noted that the 'bottom of the well' may refer to the boundary between well-bottom and liquid. Auto-focus may focus on this boundary. The 'above' and 'below' focus positions may then be determined as offsets with respect to the auto-focus position. Alternatively, the bright field output image 400 may be generated only as the first output image, e.g., from the "Z-plus" focus position.

Figure 4B:
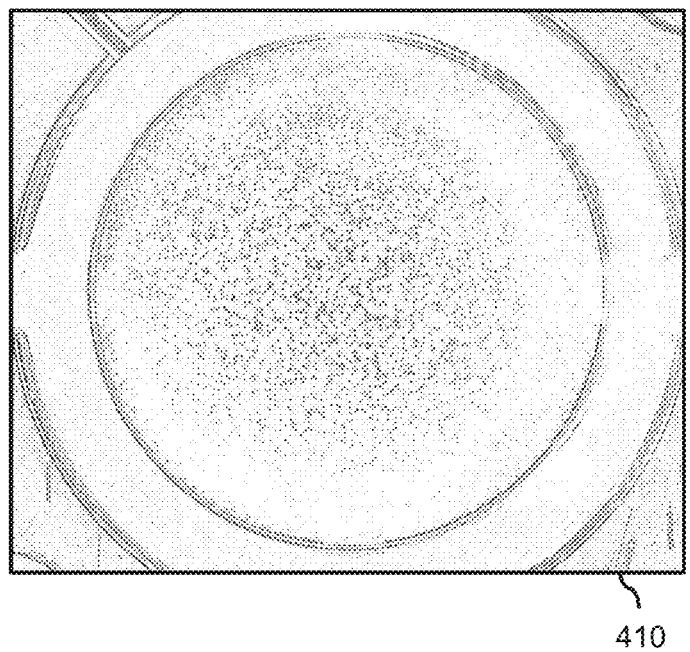
FIG. 4B shows a phase difference output image.

Moreover, as shown in FIG. 4B, additionally or alternatively a phase difference output image 410 may be generated as a difference of the first output image and the second output image. The bright field output image 400, the difference output image 410 and/or any of the other (intermediate) output images may be then displayed to a user, but also archived on a storage medium or further processed by a processing entity, such as the imaging system itself or another workstation, server, etc.

It will be appreciated that FIGS. 2A-4B have been contrast- and brightness-enhanced for facilitating reproduction in a patent publication and may not be directly representative of the output images as generated by the imaging system. Of these figures, FIGS. 3A-4B have been enhanced with the largest gain value as otherwise their contents would not be (easily) legible when reproduced in a patent publication.

It will be appreciated that any of the (intermediate) output images as described in this specification may in some embodiments comprise signed values. If such images are to be displayed on a display or in archived in a standard image format, it may be needed to add an offset to the signed values, e.g., of 128 if the display range is 8 bit (from 0 to 255). Moreover, a scaling factor may be applied before adding the offset to better use the dynamic range of the display or of the standard image format. For example, if an intermediate output image comprises signed values in the range of −0.5 to 0.5, a scaling by a factor of 256 may be applied after which an offset of 128 may be added. Such data conversion is within reach of the skilled person.

It will be appreciated that the terms 'merging' and 'combining' may, when used in reference to generating an output image based on multiple input images, refer to a particular region in an output image being generated as a function of, or based on, the image content of one or more of the these input images at the same or similar region. A non-limiting example is a pixel-wise processing. As such, the terms are not to be understood as including simply showing the input images side-by-side, e.g., by image stitching, or the generating of entirely different types of output images.

Figure 5:
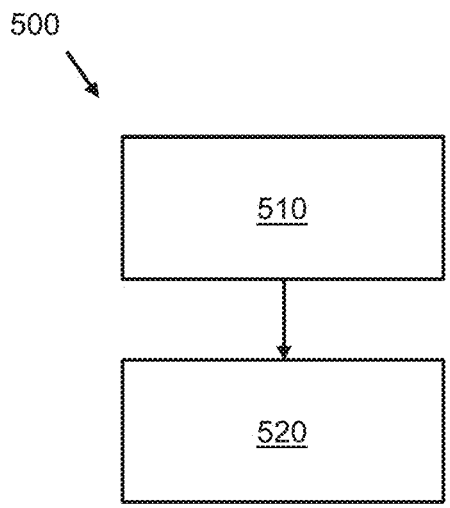
FIG. 5 shows a method of imaging individual wells of a microplate.

FIG. 5 shows a computer-implemented method for imaging individual wells of a microplate with an imaging system. The imaging system may be of a type as described in this specification, but may also be of a different type provided that it comprises a camera, a light source and a camera interface and allows the camera to be configured to acquire a series of images of a well and to obtain the image data.

The method 500 comprises, in an operation titled "CONTROLLING CAMERA TO ACQUIRE IMAGE SERIES", controlling 510 the camera to acquire a series of images of the well with different exposures, the series of images comprising a base image with a base exposure and at least one further image with a larger exposure than the base exposure. The method 500 further comprises, in an operation titled "MERGING IMAGE SERIES INTO OUTPUT IMAGE", merging 520 the series of images into an output image which comprises in a center region of the well image content from the base image and at a peripheral region of the well image content from the at least one further image.

Figure 6:
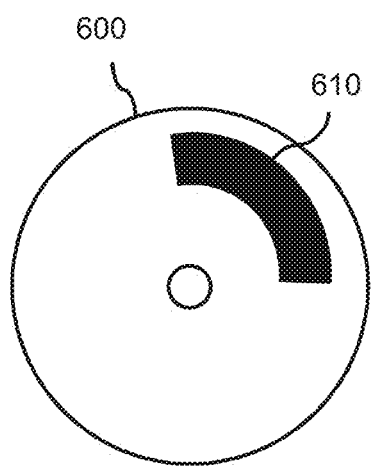
FIG. 6 shows a computer readable medium comprising non-transitory data, with said data representing a computer program for performing the method.

The method 500 may be implemented on a processor system, e.g., on a computer as a computer implemented method, as dedicated hardware, or as a combination of both. As also illustrated in FIG. 6, instructions for the computer, e.g., executable code, may be stored on a computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 600.

Examples, embodiments or optional features, whether indicated as non-limiting or not, are not to be understood as limiting the invention as claimed.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An imaging system for imaging individual wells of a microplate, the imaging system comprising:
    a camera comprising magnification optics to establish a field of view encompassing a well when the well is positioned within the field of view of the camera;
    a camera interface including wired or wireless data communication circuitry configured to provide control data to the camera to control the imaging by the camera, and to receive image data acquired by the camera;
    a light source for illuminating the well;
    a memory comprising instruction data representing a set of instructions; and a processor configured to communicate with the camera interface and the memory and to execute the set of instructions, wherein the set of instructions, when executed by the processor, cause the processor to:
control the camera to acquire a series of images of the well with different exposures, the series of images comprising a base image with a base exposure and at least one further image with a larger exposure than the base exposure, and
merge the series of images into an output image which comprises, in a center region of the well, image content from the center region in the base image, and which comprises, in a peripheral region of the well, image content from the peripheral region in the at least one further image, wherein the set of instructions, when executed by the processor, cause the processor to merge the series of images into the output image by selecting a different set of frequency components from each of the series of images for inclusion in the output image.

2. The imaging system according to claim 1, wherein the set of instructions, when executed by the processor, cause the processor to select the base exposure to minimize clipping in the center region of the well in the base image.

3. The imaging system according to claim 1, wherein the selecting the different set of frequency components comprises:
selecting at least lower frequency components from the base image; and
selecting higher frequency components, while omitting selecting the lower frequency components, from the further image.

4. The imaging system according to claim 3, wherein the set of instructions, when executed by the processor, cause the processor to select the different set of frequency components from each of the series of images by:
generating a Laplacian of Gaussian pyramid representation of the base image; and
generating a Laplacian of Gaussian pyramid representation of the further image which comprises fewer levels than the Laplacian of Gaussian pyramid representation of the base image and thereby omits the lower frequency components.

5. The imaging system according to claim 4, wherein the set of instructions, when executed by the processor, cause the processor to generate the output image by:
calculating an intermediate base output image from the Laplacian of Gaussian pyramid representation of the base image;
calculating an intermediate further output image from the Laplacian of Gaussian pyramid representation of the further image; and
merging the intermediate base output image and the intermediate further output image.

6. The imaging system according to claim 5, wherein the merging the intermediate base output image and the intermediate further output image comprises summing or averaging the intermediate base output image and the intermediate further output image.

7. The imaging system according to claim 4, wherein the set of instructions, when executed by the processor, cause the processor to generate the output image by:
combining the Laplacian of Gaussian pyramid representation of the base image and the Laplacian of Gaussian pyramid representation of the further image to obtain a combined Laplacian of Gaussian pyramid representation; and
deriving the output image from the combined Laplacian of Gaussian pyramid representation.

8. The imaging system according to claim 1, wherein the set of instructions, when executed by the processor, cause the processor to:
control the camera to acquire a first series of images of the well having a first focus position with respect to the well;
control the camera to acquire a second series of images of the well having a second focus position with respect to the well;
merge the first series of images into a first output image;
merge the second series of images into a second output image; and
generate a bright field output image as a sum or average of the first output image and the second output image.

9. The imaging system according to claim 8, wherein the set of instructions, when executed by the processor, cause the processor to generate a phase difference output image as a difference of the first output image and the second output image.

10. The imaging system according to claim 1, further comprising a light source control interface for controlling the light source.

11. The imaging system according to claim 1, wherein the imaging system is a microplate reader.

12. The imaging system according to claim 1, wherein the microplate is a 96-well microplate.

13. A method of imaging individual wells of a microplate with an imaging system, the method comprising:
providing an imaging system, the imaging system comprising:
a camera comprising magnification optics to establish a field of view encompassing a well when the well is positioned within the field of view of the camera;
a camera interface including wired or wireless data communication circuitry configured to provide control data to the camera to control the imaging by the camera, and to receive image data acquired by the camera; and
a light source for illuminating the well;
controlling the camera to acquire a series of images of the well with different exposures, the series of images comprising a base image with a base exposure and at least one further image with a larger exposure than the base exposure; and
merging the series of images into an output image which comprises, in a center region of the well, image content from the center region in the base image, and which comprises, in a peripheral region of the well, image content from the peripheral region in the at least one further image, wherein merging the series of images includes merging the series of images into the output image by selecting a different set of frequency components from each of the series of images for inclusion in the output image.

14. A non-transitory computer-readable medium comprising a computer program executable by a processor system of an imaging system comprising a camera comprising magnification optics to establish a field of view encompassing a well when the well is positioned within the field of view of the camera, a camera interface including wired or wireless data communication circuitry configured to provide control data to the camera to control the imaging by the camera and to receive image data acquired by the camera, and a light source for illuminating the well, the computer program comprising instructions for causing the processor system to perform functionality comprising:

controlling the camera to acquire a series of images of the well with different exposures, the series of images comprising a base image with a base exposure and at least one further image with a larger exposure than the base exposure; and merging the series of images into an output image which comprises, in a center region of the well, image content from the center region in the base image, and which comprises, in a peripheral region of the well, image content from the peripheral region in the at least one further image, wherein merging the series of images includes merging the series of images into the output image by selecting a different set of frequency components from each of the series of images for inclusion in the output image.

15. The method of claim 13 further comprising: selecting the base exposure to minimize clipping in the center region of the well in the base image.

16. The method of claim 13, wherein the selecting the different set of frequency components comprises:

selecting at least lower frequency components from the base image; and selecting higher frequency components, while omitting selecting the lower frequency components, from the further image.

17. The method of claim 16, wherein the selecting the different set of frequency components comprises:

generating a Laplacian of Gaussian pyramid representation of the base image; and generating a Laplacian of Gaussian pyramid representation of the further image which comprises fewer levels than the Laplacian of Gaussian pyramid representation of the base image and thereby omits the lower frequency components.

18. The method of claim 17 further comprising generating the output image by:

calculating an intermediate base output image from the Laplacian of Gaussian pyramid representation of the base image;

calculating an intermediate further output image from the Laplacian of Gaussian pyramid representation of the further image; and merging the intermediate base output image and the intermediate further output image.

* * * * *